(12) United States Patent
Reddy et al.

(10) Patent No.: US 7,748,454 B2
(45) Date of Patent: Jul. 6, 2010

(54) GELATION INHIBITING RETARDERS FOR HIGHLY REACTIVE CALCIUM SILICATE BASED BINDER COMPOSITIONS AND METHODS OF MAKING AND USING SAME

(75) Inventors: B. Raghava Reddy, Duncan, OK (US); Bryan K. Waugh, Comanche, OK (US); Russell M. Fitzgerald, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/110,885

(22) Filed: Apr. 28, 2008

(65) Prior Publication Data

US 2009/0266543 A1    Oct. 29, 2009

(51) Int. Cl.
  *E21B 33/13* (2006.01)
(52) U.S. Cl. ...................... 166/293; 166/300
(58) Field of Classification Search ................ None
  See application file for complete search history.

(56) References Cited

U.S. PATENT DOCUMENTS

| | | | |
|---|---|---|---|
| 3,426,104 A | | 2/1969 | Masson |
| 4,500,357 A | | 2/1985 | Brothers et al. |
| 4,761,183 A | | 8/1988 | Clarke |
| 4,915,845 A | | 4/1990 | Leighton et al. |
| 5,263,542 A | * | 11/1993 | Brothers ............... 166/293 |
| 5,339,903 A | | 8/1994 | Eoff et al. |
| 5,346,012 A | | 9/1994 | Heathman et al. |
| 5,398,759 A | * | 3/1995 | Rodrigues et al. ....... 166/293 |
| 5,489,599 A | | 2/1996 | Carter et al. |
| 5,547,612 A | | 8/1996 | Austin et al. |

(Continued)

FOREIGN PATENT DOCUMENTS

EP    0611081 A2    8/1994

(Continued)

OTHER PUBLICATIONS

Mueller, D. T., et al., "Blast furnace slag technology: features, limitations, and practical applications", SPE 28475, 1994, pp. 117-129, Society of Petroleum Engineers, Inc.

(Continued)

*Primary Examiner*—Zakiya W. Bates
(74) *Attorney, Agent, or Firm*—Craig W. Roddy; Conley Rose, P.C.

(57) ABSTRACT

A method of servicing a wellbore comprising placing in the wellbore a composition comprising a non-API compliant reactive calcium silicate based hydraulic binder and at least one gelation inhibiting retarder, and allowing the composition to set. A method of servicing a wellbore comprising placing in a wellbore a cement composition comprising an industrial waste product selected from the group consisting of Class C Fly ash, cement kiln dust, and combinations thereof and a gelation inhibitor, and allowing the composition to set. A method of controlling the thickening time of a cementitious composition comprising contacting a material having greater than 15 wt. % of tricalcium aluminate and tetracalcium aluminoferrite with a gelation inhibitor comprising a alkylbenzene sulfonic acid, at least one methallyl sulfonic acid monomer; at least one copolymerizable nonionic monomer, and at least one copolymerizable olefinically unsaturated carboxylic acid monomer.

30 Claims, 1 Drawing Sheet

U.S. PATENT DOCUMENTS

| | | | |
|---|---|---|---|
| 5,588,488 | A | 12/1996 | Vijn et al. |
| 5,698,512 | A | 12/1997 | Austin et al. |
| 5,913,364 | A | 6/1999 | Sweatman |
| 6,167,967 | B1 | 1/2001 | Sweatman |
| 6,258,757 | B1 | 7/2001 | Sweatman et al. |
| 6,591,910 | B1 | 7/2003 | Chatterji et al. |
| 6,630,021 | B2 | 10/2003 | Reddy et al. |
| 6,729,405 | B2 | 5/2004 | DiLullo et al. |
| 6,770,604 | B2 | 8/2004 | Reddy et al. |
| 6,776,237 | B2 | 8/2004 | Dao et al. |
| 6,843,846 | B2 | 1/2005 | Chatterji et al. |
| 6,978,835 | B1 | 12/2005 | Reddy et al. |
| 6,983,799 | B2 | 1/2006 | Reddy et al. |
| 7,004,256 | B1 | 2/2006 | Chatterji et al. |
| 7,077,203 | B1 | 7/2006 | Roddy et al. |
| 7,087,189 | B2 | 8/2006 | Austin et al. |
| 7,147,705 | B2 | 12/2006 | Chatterji et al. |
| 7,174,962 | B1 | 2/2007 | Roddy et al. |
| 7,198,104 | B2 | 4/2007 | Griffith et al. |
| 7,199,086 | B1 | 4/2007 | Roddy et al. |
| 7,204,307 | B2 | 4/2007 | Roddy et al. |
| 7,204,310 | B1 | 4/2007 | Roddy et al. |
| 7,238,733 | B2 | 7/2007 | Vijn et al. |
| 7,244,303 | B2 | 7/2007 | Chatterji et al. |
| 7,284,609 | B2 | 10/2007 | Roddy et al. |
| 7,290,613 | B2 | 11/2007 | Santra et al. |
| 7,297,664 | B2 | 11/2007 | Santra et al. |
| 7,316,742 | B2 | 1/2008 | Brothers et al. |
| 7,320,730 | B2 | 1/2008 | Brothers et al. |
| 7,325,611 | B2 | 2/2008 | Santra et al. |
| 7,335,252 | B2 | 2/2008 | Roddy et al. |
| 7,337,842 | B2 | 3/2008 | Roddy et al. |
| 7,338,923 | B2 | 3/2008 | Roddy et al. |
| 7,341,104 | B2 | 3/2008 | Roddy et al. |
| 7,350,574 | B2 | 4/2008 | Santra et al. |
| 7,353,870 | B2 | 4/2008 | Roddy et al. |
| 7,381,263 | B2 | 6/2008 | Roddy et al. |
| 7,438,758 | B2 | 10/2008 | Santra et al. |
| 7,462,234 | B2 | 12/2008 | Reddy et al. |
| 7,530,395 | B2 | 5/2009 | Reddy et al. |
| 7,537,656 | B2 | 5/2009 | Santra et al. |
| 2005/0109507 | A1 | 5/2005 | Heathman et al. |
| 2006/0234871 | A1* | 10/2006 | Dalrymple et al. .......... 507/211 |

FOREIGN PATENT DOCUMENTS

| | | |
|---|---|---|
| EP | 1780185 A1 | 5/2007 |
| WO | 9748879 A1 | 12/1997 |
| WO | 2006040513 A1 | 4/2006 |

OTHER PUBLICATIONS

Foreign communication from a related counterpart application—International Search Report and Written Opinion, PCT/GB2009/000944, Oct. 16, 2009, 14 pages.

* cited by examiner

*FIG. 1*

GELATION INHIBITING RETARDERS FOR HIGHLY REACTIVE CALCIUM SILICATE BASED BINDER COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Field

This disclosure relates to servicing a wellbore. More specifically, it relates to servicing a wellbore with cement compositions comprising gelation inhibiting retarders and methods of making and using same.

2. Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Generally, cements suitable for wellbore servicing meet standards defined by the American Petroleum Institute (API). These types of cements, designated API cements, are formulated to exhibit a process-desired rheology such as consistent viscosities, suitable thickening times, high compressive strengths after setting, good fluid loss control, etc., which allows for a sufficient time period in order for the cements to be placed into the wellbore at bottom hole circulating temperatures (BHCT) before setting. For example, the fluidity periods of these API cements (e.g., Class A, Class C, or Class H Portland cements) are required to be greater than 90 minutes at specified temperatures and pressures. The fluidity period (i.e., the thickening time) may be measured by determining the time required for the API cement to reach 70 Bearden units after the components are mixed. In some cases, gelation inhibitors such as sulfonated aromatic polymers and/or high temperature retarders such as sulfonated styrene maleic anhydride polymers are used to extend the thickening time of API cements.

It is also a common practice to blend non-cementitious industrial by-products with API cements in wellbore servicing for a variety of reasons, such as for example cost-reduction, reduced permeability, reduced energy consumption by utilizing less API Portland cement, and reduced disposal costs for disposing waste products. Examples of non-cementitious industrial by-products include without limitation Class F Fly-ash and silica fume. Pozzalonic reactions between the non-cementitious industrial by-products and calcium hydroxide generated by the API cement hydration generates additional binder materials which contribute to the strength of the set cement.

The demanding criteria imposed for an API designation results in an increased production cost for these cements when compared to other cement compositions lacking the API designation. In addition, the available supply of API cements is decreasing which may be attributed to their relatively expensive production costs and low usage volumes.

Other cement compositions, lacking the API designation, have not typically been used either in combination with API Portland cements or by themselves in wellbore servicing. These non-API cements typically confirm to ASTM standards, which are less demanding than the API standards. Examples of non-API cements are non-API Portland Type I cements, which are generally used in construction applications such as constructing bridges, roads, buildings, and the like. These non-API cements do not have properties suitable for servicing wellbores. For example, these cements typically exhibit a premature loss of fluidity of the cement slurry which may be tolerable for construction applications but is unsuitable for wellbore servicing applications.

Another example of non-API cements are non-cementitious industrial by-products that comprise calcium silicate materials comprising aluminates and free lime such as Class C fly ash, cement kiln dust, and blast furnace slag. These non-cementitious industrial by-products react with water causing a rapid loss of fluidity, and thus do not meet the API specifications set for wellbore servicing materials. A challenge to the use of non-API Portland cements, such as non-API Portland Type I cements and reactive industrial by-products (e.g., Class C fly ash, cement kiln dust, blast furnace slag,) is the ability to control the rheology of the cement slurry and provide process-desired rheology within the periods as specified by the API for different wellbore conditions. For example, non-API Portland cements may exhibit premature gelation, and shortened, and/or unpredictable thickening times. Thus, an ongoing need exists for materials to control the rheology of cement compositions suitable for wellbore servicing.

As mentioned in previous paragraphs, loss of slurry fluidity due to premature gelation not only provides challenges for safe placement of the slurry, but also results in slow strength development because of the lag time between the time of fluidity loss and the hydration time of the cement binder. Strength development begins with cement hydration, whereas gelled cement does not develop adequate strength to provide support for the casing and/or zonal isolation and is permanently deformable under stress. Thus, it is desirable to minimize the time lag between these phases, so that further wellbore operations can be carried out without a prolonged waiting-on-cement (WOC) duration.

SUMMARY

Disclosed herein is a method of servicing a wellbore comprising placing in the wellbore a composition comprising a non-API compliant reactive calcium silicate based hydraulic binder and at least one gelation inhibiting retarder, and allowing the composition to set.

Also disclosed herein is a method of servicing a wellbore comprising placing in a wellbore a cement composition comprising an industrial waste product selected from the group consisting of Class C Fly ash, cement kiln dust, and combinations thereof and a gelation inhibitor, and allowing the composition to set.

Further disclosed herein is a method of controlling the thickening time of a cementitious composition comprising contacting a material having greater than 15 wt. % of tricalcium aluminate and tetracalcium aluminoferrite with a gelation inhibitor comprising a alkylbenzene sulfonic acid, at least one methallyl sulfonic acid monomer; at least one copolymerizable nonionic monomer, and at least one copolymerizable olefinically unsaturated carboxylic acid monomer.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are wellbore servicing compositions comprising one or more non-API compliant reactive calcium silicate based hydraulic binders (HRCBs) and one or more gelation inhibiting retarders (GIRs) and methods of making and using same. The HRCB and GIR will be described in more detail later herein. Herein after the non-API compliant and API compliant materials (e.g. cements) will be referred to as non-API and API materials respectively. The wellbore servicing compositions comprising an HRCB and a GIR of the type described herein may display process-desired rheological characteristics such as for example a predictable thickening time.

In an embodiment, the wellbore servicing composition comprises a non-API reactive calcium silicate based hydraulic binder (HRCB). Herein an HRCB is defined as a non-API cementitious material having a high level of active species. Examples of active species include without limitation tricalcium aluminate $(CaO)_3Al_2O_3$, which is also referred to as $C_3A$, tetracalcium aluminoferrite $(CaO)_4Al_2O_3 \cdot Fe_2O_3$, which is also referred to as $C_4AF$, and lime. In an embodiment, the HRCB comprises non-API Portland cement having a total amount of active species i.e., $C_3A$ and $C_4A$ of greater than about 15 wt. % by total weight of the HRCB, alternatively from about 20 wt. % to about 40 wt. %, alternatively from about 25 wt. % to about 35 wt. %; and a ratio of $C_3A:C_4AF$ of from about 5:1 to about 0.5:1, alternatively from about 3:1 to about 1:1, alternatively from about 2:1 to about 0.7:1; an amount of $C_3A$ of greater than about 8 wt % by weight of the HRCB, alternately from about 10 wt % to about 15 wt %, alternatively from about 12 wt % to about 14 wt %.

Alternatively, the HRCB comprises, alternatively consists essentially of, and alternatively consists of calcium and silicon (e.g., $SiO_2$) and lesser amounts of aluminum (e.g., $Al_2O_3$) that when mixed with water under API specification Schedules 4 and 5 show thickening times less than 90 minutes, as determined in accordance with API Specification 10A, $22^{nd}$ Edition, Jan. 1, 1995.

In an embodiment, the HRCB has a ratio of $SiO_2:Al_2O_3$ of equal to or greater than about 1.2:1, alternatively of equal to or greater than about 3:1, alternatively of equal to or greater than about 5:1. In another embodiment, the HRCB comprises calcium oxide in an amount of greater than about 15% by weight of the total oxides (wt. %), alternatively from about 30 wt. % to about 70 wt. %, alternatively from about 45 wt. % to about 60 wt. %.

HRCBs suitable for use in this disclosure include without limitation non-API cementitious industrial by-products such as Class C fly ash, cement kiln dust, blast furnace slag, or combinations thereof. These cementitious industrial by-products are typically used in standard construction cement formulations. Such materials may be characterized by their rapid exothermic hydration in water to form gelatinous products resulting in the rapid loss of fluidity.

In an embodiment, the HRCB comprises, alternatively consists essentially of, and alternatively consists of Class C fly ash. Fly ashes in general are finely divided residue resulting from the combustion of ground or powdered coal. They are generally finer than cement and consist mainly of glassy-spherical particles as well as residues of hematite and magnetite, char, and some crystalline phases formed during cooling. Class C fly ash is normally produced from the burning of subbituminous coal and lignite and usually has cementitious properties in addition to pozzolanic properties due to the presence of analytical content of lime (CaO) which may constitute upwards of about 15 wt. % of the material, alternatively from about 20 wt. % to about 35 wt. %, alternatively from about 22 wt. % to about 30 wt. %. An analytical content of lime refers to the total content of Ca relative to the oxide CaO. The analytical content of CaO may include free lime, i.e., free CaO and CaO present in a chemical combined state, for example, in the amorphous or glassy phase or crystalline phases, such as without limitation in calcium silicates and calcium aluminates, crystalline melilite ($Ca_2Al_2SiO_8$), merwinite ($Ca_3MgSi_2O_7$), and the like.

In an embodiment, Class C fly ash comprises a combined amount of silicon dioxide, aluminum oxide, and iron oxide of equal to or less than about 50 wt. % by total weight of the Class C fly ash, alternatively from about 25 wt. % to about 50 wt. %, alternatively from about 30 wt. % to about 40 wt. %; sulfur trioxide in an amount of equal to or less than about 5 wt. % by total weight of the Class C fly ash, alternatively from about 2 wt. % to about 4 wt. %, alternatively from about 3 wt. % to about 4 wt. %; moisture in an amount of less than about 3 wt. % by total weight of the Class C fly ash, alternatively from about 1 wt. % to about 3 wt. %, alternatively from about 2 wt. % to about 3 wt. %; and a loss of ignition value of less than about 6 wt. % by total weight of the Class C fly ash, alternatively from about 1 wt. % to about 5 wt. %, alternatively from about 2 wt. % to about 4 wt. %, as determined in accordance with ASTM C618.

In an embodiment, the HRCB comprises, alternatively consists essentially of, and alternatively consists of cement kiln dust. Kiln dusts in general are fine by-products of operations employing kilns that are captured in the air pollution control dust collection system (e.g., cyclones, electrostatic precipitators, and baghouses). For example, cement kilns are used for the pyroprocessing stage of manufacture of hydraulic cements in which calcium carbonate reacts with silica-bearing minerals to form a mixture of calcium silicates. Cement kiln dust (CKD) is a fine powdery material similar in appearance to Portland cement. There are two types of cement kiln processes: wet-process kilns, which accept feed materials in a slurry form; and dry-process kilns, which accept feed materials in a dry, ground form. In each type of process the dust can be collected and processed in two ways: (1) a portion of the dust can be separated and returned to the kiln from the dust collection system (e.g., cyclone) closest to the kiln, or (2) the total quantity of dust produced can be recycled or discarded. The chemical and physical characteristics of CKD that is collected for use outside of the cement production facility will depend in great part on the method of dust collection employed at the facility. In an embodiment, a CKD suitable for use in this disclosure may contain analytical CaO in an amount of from about 15 wt. % to about 60 wt. % by weight of the CKD, alternatively from about 25 wt. % to about 55 wt. %, alternatively from about 25 wt. % to about 40 wt. %; $SiO_2$ in an amount of from about 13 wt. % to about 21 wt. % by weight of the CKD, alternatively from about 15 wt. % to about 20 wt. %, alternatively from about 16 wt. % to about 18 wt. %; $Al_2O_3$ in an amount of from about 2 wt. % to about 8 wt. % weight of the CKD, alternatively from about 3 wt. % to about 7 wt. %, alternatively from about 4 wt. % to about 6 wt. %.

In an embodiment, the HRCB comprises, alternatively consists essentially of, alternatively consists of blast furnace slag. Blast furnace slag is primarily collected as a waste product from iron and steel manufacturing processes, which is obtained by quenching the molten iron slag in water or steam, followed by grinding to a finer size. It is a glassy amorphous material comprising, alternatively consisting essentially of, and alternatively consisting of silica in an amount of from about 25 wt. % to about 45 wt. % by weight of the blast furnace slag, alternatively from about 30 wt. % to about 40 wt. %, alternatively from about 32 wt. % to about 38 wt. %; alumina in an amount of from about 7 wt. % to about 20 wt. % by weight of the blast furnace slag, alternatively from about 10 wt. % to about 18 wt. %, alternatively from about 12 wt. % to about 16 wt. %; MgO in an amount of from about 1 wt. % to about 20 wt. % by weight of the blast furnace slag, alternatively from about 5 wt. % to about 15 wt. %, alternatively from about 7 wt. % to about 12 wt. %; and analytical calcium oxide in an amount of from about 30 wt. % to about 50 wt. % by weight of the blast furnace slag, alternatively from about 35 wt. % to about 45 wt. %, alternatively from about 37 wt. % to about 42 wt. %.

In an embodiment, the amount of HRCB in the wellbore servicing composition may range from about 30 wt. % to about 100 wt. % by total weight of the solids in the wellbore servicing composition, alternatively from about 40 wt. % to about 90 wt. %, or alternatively from about 50 wt. % to about 80 wt. %.

In an embodiment, the wellbore servicing composition may further comprise a non-API Portland cement. Non-API Portland cement suitable for use in this disclosure includes without limitation Portland cements that do not meet the API specifications for thickening times when tested under Schedules 4 and 5 as described previously. Non-API Portland cements are fine powders produced by grinding cement clinker, calcium sulfate, and up to about 5 wt. % minor constituents. Non-API Portland cement (i.e., powdered non-API Portland cement) is a hydraulic material that comprises from about 45 wt. % to about 75 wt. % tricalcium silicate ($3CaO.SiO_2$), from about 7 wt. % to about 32 wt. % dicalcium silicate ($2CaO.SiO_2$), from about 0 wt. % to about 15 wt. % tricalcium aluminate $(CaO)_3Al_2O_3$, from about 0 wt. % to about 18 wt. % tetracalcium aluminoferrite $((CaO)_4Al_2O_3.Fe_2O_3)$, and from about 2 wt. % to about 10 wt. % gypsum ($CaSO_4.H_2O$).

Typically, these non-API Portland cements are used for construction applications such as civil structures above the ground. These types of cements typically have rapid hydration and loss of fluidity due to high level of Al containing active species such as $C_3A$ and $C_4AF$. Currently, there are no global specifications for Al containing active species (e.g., $C_3A$ and $C_4AF$) amounts in construction grade non-API Portland cements and thus the amount of $C_3A$ in the non-API Portland cements varies depending on manufacturers. In an embodiment, the HRCB may comprise non-API Portland cement having Al containing active species (e.g., $C_3A$ and $C_4AF$) in an amount of greater than about 15 wt. % by total weight of the HRCB, alternatively from about 20 wt. % to 40 wt. %, alternatively from about 16 wt. % to about 30 wt. %; and a ratio of $C_3A$ to $C_4AF$ in an amount of from about 5:1 to about 0.5:1, alternatively from about 3:1 to about 1:1, alternatively from about 2:1 to about 1:2; an amount of $C_3A$ of greater than about 8 wt. % by total weight of HRCB, alternately from about 10 wt. % to 15 wt. %.

In an embodiment, the non-API Portland cement is present in the wellbore servicing composition in an amount of from about 20 wt. % to about 100 wt. % of total weight of the solid wellbore composition, alternatively from about 30 wt. % to about 70 wt. %, alternatively from about 40 wt. % to 60 wt. %.

In an embodiment, the wellbore servicing composition may further comprise an API Portland cement. In contrast to the non-API Portland cements described previously, API Portland cements are those that meet API specifications for thickening times when tested under Schedules 4 and 5. Examples of API Portland cements suitable for oil well cementing include without limitation API Portland cements Class A, C, G, H, low sulfate resistant cements, medium sulfate resistant cements, high sulfate resistant cements, or combinations thereof.

In an embodiment, the wellbore servicing composition comprises API Portland cement in an amount of from about 0 wt. % to about 99 wt. % by total weight of the wellbore composition, alternately from about 0 wt. % to about 70 wt. %, alternately from about 0 wt. % to about 50 wt. %.

In an embodiment, the wellbore servicing composition further comprises a filler. Herein, fillers refer to be any inorganic material that is introduced to the composition in order to lower the consumption of binder material (e.g., one or more HRCBs, and optionally API and/or non-API Portland cements). In some embodiments, such fillers may improve one or more properties of the composition in which it is included. Examples of fillers suitable for use in this disclosure include without limitation ASTM Class F fly ash, sand, silica, or combinations thereof.

In an embodiment, the filler comprises ASTM Class F Fly ash. Class F fly ash comprises residues generated in the combustion of coal, typically produced from the burning of harder, older anthracite and bituminous coal. Typically, Class F fly ash contains less than about 10% lime. Unlike Class C fly ash, Class F fly ash does not react and harden with water by itself. In an embodiment, the filler may be present in the wellbore servicing composition in an amount of from about 5 wt. % to about 60 wt. % of total weight of the solid wellbore composition, alternatively from about 20 wt. % to about 50 wt. %, or alternatively from about 30 wt. % to about 40 wt. %.

In an embodiment the wellbore servicing composition comprises a gelation inhibiting retarder (GIR). The GIR may comprise a copolymer obtained by the copolymerization of at least one sulfonated monomer, at least one carboxylated monomer, and at least one nonionic monomer. Alternatively, the GIR may comprise a copolymer obtained by the copolymerization of at least two sulfonated monomers, at least one carboxylated monomers, and at least one nonionic monomer.

The sulfonated monomers may be selected from sulfonated styrene, allyloxybenezenesulfonic acid, methallyl sulfonic acid, allyl sulfonic acid, 2-acrylamido-2-methyl-1-propanesulfonic acid, their alkali metal or ammonium salts, or combinations thereof. In an embodiment, the sulfonated monomer comprises allyloxybenzenesulfonic acid. In an embodiment, the GIR comprises a copolymer produced from the polymerization of (a) at least one allyloxybenzenesulfonic acid monomer (Component A) having the general chemical formula (Structure I), (Structure I)

wherein $R_4$ is hydrogen or a $C_1$-$C_6$ alkyl; and X is hydrogen, an alkali or alkaline earth metal or ammonium; (b) at least one methallyl sulfonic acid monomer (Component B); (c) at least one copolymerizable nonionic monomer (Component C); and (d) at least one copolymerizable olefinically unsaturated carboxylic acid monomer (Component D).

As used herein, allyloxybenzenesulfonic acid (ABS) monomer is intended to include monomers selected from the group consisting of allyloxybenzenesulfonic acid and salts thereof, or combinations thereof, as defined in chemical structure I. The allyloxybenzenesulfonate monomers, may be prepared processes such as for example, those described in U.S. Pat. No. 3,426,104, incorporated by reference herein in its entirety. The allyloxybenzenesulfonate monomers found to be particularly useful herein are p-methallyloxybenzenesulfonic acid and salts thereof. The GIR may comprise at least about 2.5 mole percent (mol %) of the allyloxybenzenesulfonic acid monomer, alternatively from about 2.5 mol % to about 10 mol %, alternatively from about 3.5 mol % to about 8 mol %, alternatively from about 3.5 mol % to about 6 mol %.

As used herein, methallyl sulfonic acid (MS) monomer is intended to include monomers selected from the group consisting of methallyl sulfonic acid and the alkali or alkaline earth metal or ammonium salts thereof or combinations thereof. In an embodiment, the monomers comprise alkali metal salts of methallyl sulfonic acid such as for example the sodium or potassium salt of methallyl sulfonic acid. In an embodiment, the MS monomer comprises sodium methallyl sulfonate (SMS). The GIR may comprise at least about 0.5 mol % of the methallyl sulfonic acid monomer, alternatively from about 0.5 mol % to about 10 mol %, alternatively from about 2.5 mol % to about 8 mol %, alternatively from about 2.5 mol % to about 6 mol %.

The ABS and MS monomers may be present in amounts effective to produce the required copolymer. Additionally, of the total amount of ABS and MS monomers used, the level of ABS used may be minimized to reduce the economic cost of preparation of the GIR, as the ABS monomer is relatively expensive compared to the MS monomer. Accordingly, as much of the ABS monomer as is possible is replaced with the MS monomer. The ABS:MS molar ratio may range from about 11:1 to about 1:2, alternatively from about 3.5:2.5 to about 1:1.5.

As used herein, copolymerizable nonionic monomer is intended to include monomers represented by the general chemical structure II:

(Structure II)

wherein $n_1$ and $n_2$ are independently 0 to 10; $R_1$, $R_2$, $R_8$ and $R_9$ are independently hydrogen, $C_1C_6$ alkyl, or $C_1$-$C_6$ alkyl-substituted aryl; $R_7$ is hydrogen, $C_1$-$C_6$ alkyl, or $CO_2X$, where X is hydrogen, an alkali or alkaline earth metal or $C_1$-$C_6$ alkyl; $X_1$ and $X_2$ are absent or are independently O, C=O, or hydrogen; $R_3$ is absent or is C(=O)$R_4$, O$R_4$, N$R_5R_6$, $C_1$-$C_{18}$ alkyl or hydrogen where $R_4$ is $C_1$-$C_{18}$ alkyl or hydrogen and $R_5$ and $R_6$ are independently hydrogen, $C_1$-$C_6$ alkyl, or an alkyloxyether or alcohol; and $R_{10}$ is absent or is C(=O)$R_{11}$, O$R_{11}$, N$R_{12}R_{13}$, $C_1$-$C_{18}$ alkyl, or hydrogen, where $R_{11}$ is $C_1$-$C_{18}$ alkyl or hydrogen, $R_{12}$ and $R_{13}$ are independently hydrogen, $C_1$-$C_6$ alkyl, or an alkyloxyether or alcohol.

The copolymerizable nonionic monomer may be alternatively selected from the group consisting of $C_1$-$C_6$ alkyl esters of (meth)acrylic acid, acrylamide and the $C_1$-$C_6$ alkyl-substituted acrylamides, the N-alkyl-substituted acrylamides and the N-alkanol-substituted acyrylamides. Also useful are the $C_1$-$C_6$ alkyl esters and $C_1$-$C_6$ alkyl half-esters of unsaturated vinylic acids, such as maleic acid and itaconic acid, and $C_1$-$C_6$ alkyl esters of saturated aliphatic monocarboxylic acids, such as acetic acid, propionic acid, and valeric acid. Copolymerizable nonionic monomers may be selected from the group consisting of methyl (meth)acrylate, mono- and dimethyl maleate, mono- and di-ethyl itaconate, and (meth)allyl acetates, propionates, and valerates. Alternatively, the copolymerizable nonionic monomer comprises methyl methacrylate. The GIR may contain from about 10 mol % to about 20 mol % of the copolymerizable nonionic monomer, alternatively from about 12 mol % to about 18 mol %. Minor amounts of crosslinking monomers such as diallyl maleate, alkylene bisacrylamide, and triallyl cyanurate may also be employed herein.

As used herein, a copolymerizable olefinically unsaturated carboxylic acid monomer is intended to include aliphatic, branched or cyclic, mono- or dicarboxylic acids, the alkali or alkaline earth metal or ammonium salts thereof, or the anhydrides thereof. Examples of suitable monocarboxylic acid monomers include without limitation acrylic acid, methacrylic acid, ethacrylic acid, or combinations thereof (the "acrylate" monomer). In an embodiment, the acrylate monomers useful in the production of the GIR comprise olefinically unsaturated carboxylic acid monomer containing at least one activated polymerizabe carbon-to-carbon olefinic double bond, and at least one carboxyl group, that is, an acid containing an olefinic double bond which readily participates in polymerization because of its presence in the monomer molecule either in the alpha-beta position with respect to a carboxyl group, or as a part of a terminal methylene grouping. Useful olefinically unsaturated acids of this class include such widely divergent materials as the acrylic acid comonomers typified by acrylic acid itself, methacrylic acid, ethacrylic acid, alpha-chloro-acrylic acid, alpha-cyano acrylic acid, alpha-chloro-acrylic acid, alpha-cyano acrylic acid, beta-methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), or polycarboxylic acid monomers such as itaconic acid, maleic acid, citraconic acid, mesaconic acid, glutaconic acid, aconitic acid, fumaric acid, and tricarboxy ethylene. For the polycarboxylic acid monomers, an anhydride group may be formed by the elimination of one molecule of water from two carboxyl groups located on the same polycarboxylic acid molecule. In an embodiment, the GIR comprises olefinically unsaturated carboxylic acid monomers such as monoolefinic acrylic acids having a substituent on the olefinic α-carbon selected from the class consisting of hydrogen, halogen and hydroxyl groups, monovalent alkyl radicals, monovalent aryl radicals, monovalent aralkyl radicals and monovalent cycloaliphatic radicals. As used herein, (meth)acrylic acid is intended to include acrylic acid and methacrylic acid. The GIR may comprise at least about 60 mol % of the copolymerizable unsaturated carboxylic acid monomer, alternatively from about 60 mol % to about 87 mol %, alternatively from about 70 mol % to about 87 mol %, alternatively from about 75 mol % to about 85 mol %. In an embodiment, the copolymerizable unsaturated carboxylic acid monomers comprise acrylic and methacrylic acid, alternatively acrylic acid.

The weight average molecular weight of the polymers comprising the GIR ranges widely, including polymers from about 1,000 to about 50,000 Daltons, alternatively from about 5,000 to about 20,000 Daltons. GIRs of the type disclosed herein are described in U.S. Pat. Nos. 5,547,612, 5,698,512 and 7,087,189, and U.S. patent application Ser. No. 11/691,394 entitled "Methods of Using Wellbore Servicing Compositions" and U.S. patent application Ser. No. 11/691,395 entitled "Wellbore Servicing Composition" both filed on Mar. 26, 2007, each of which is incorporated by reference herein in its entirety. Examples of suitable GIRs include without limitation AQUATREAT 540 and ALCOSPERSE 240, which are copolymers comprising sulfonated aromatic monomers, nonionic monomers, and acrylate monomers, and are commercially available from ALCO Chemical Company.

The amount of GIR in the wellbore servicing composition may range from about 0.05 wt. % to about 4 wt. % by total weight of the wellbore servicing composition, alternatively from about 0.1 wt. % to about 2 wt. %, alternatively from about 0.3 wt. % to about 1.5 wt. %. The GIR may be used as a solid, as a solution in water, or as a dispersion in a nonaqueous liquid.

In an embodiment, the wellbore servicing composition may further comprise, in addition to the GIR, additional set modifiers. These additional set modifiers are materials such as set retarders and set accelerators that function to alter the time required for the composition to undergo the phase transition from a fluid slurry to a set solid mass. Such materials may allow the operator additional control of the set time of the composition based on a variety of factors such as for example the wellbore temperature at which the wellbore servicing composition will be used. In an embodiment, an additional set modifier suitable for use with the wellbore servicing compositions of this disclosure comprises organic acids such as citric, tartaric acids, or lignosulfonates, or combinations thereof. Various organic acids can be included in the additional SMC including, but not limited to, tartaric acid, citric acid, oxalic acid, gluconic acid, oleic acid, uric acid, or combinations thereof. Examples of suitable organic acids includes without limitation HR®-25 and Fe-2®, which are cement retarder and iron sequestering agent, and are commercially available from Halliburton Energy Services, Inc., of Duncan, Okla.

In an embodiment, the additional set modifier may be included in the wellbore servicing composition in amounts ranging from about 0.1 wt. % to about 10 wt. % based on the weight of the composition, alternatively from about 0.3 wt. % to about 5.0 wt. %, alternatively from about 0.4 wt. % to about 2.0 wt. %.

The wellbore servicing composition may include a sufficient amount of water to form a pumpable slurry. The water may be fresh water or salt water, e.g., an unsaturated aqueous salt solution or a saturated aqueous salt solution such as brine or seawater. The water may be present in the amount from about 20 wt. % to about 180 wt. % by weight of cementitious material, alternatively from about 28 wt. % to about 60 wt. %. The amount of water may depend on the desired density of the cement slurry and the desired slurry rheology and as such may be determined by one of ordinary skill in the art with the aid of this disclosure.

In some embodiments, additives may be included in the wellbore servicing composition for improving or changing the properties thereof. Examples of such additives include but are not limited to, defoamers, foaming surfactants, fluid loss agents, weighting materials, latex emulsions, dispersants, formation conditioning agents, hollow glass or ceramic beads, densifying agents such as haemetite, manganese oxides, barium sulfate, or combinations thereof. Other mechanical property modifying additives, for example, elastomers, carbon fibers, glass fibers, metal fibers, minerals fibers, and the like can be added to further modify the mechanical properties. These additives may be included singularly or in combination. Methods for introducing these additives and their effective amounts can be determined by one of ordinary skill in the art with the aid of this disclosure.

The components of the wellbore servicing composition comprising one or more HRCBs and one or more GIRs of the types described herein may be combined in any order desired by the user to form a slurry that may then be placed into a wellbore. The components of the wellbore servicing composition comprising an HRCB and a GIR may be combined using any mixing device compatible with the composition, for example a bulk mixer or a recirculating mixer. The resultant wellbore servicing composition may provide a cost benefit to the production process due to the incorporation of lesser amounts of the API grade cements (e.g., API Portland cements). Hereinafter, the wellbore servicing composition comprising an HRCB and a GIR both of the types described herein will be referred to a reduced cost wellbore composition (RCWC).

The RCWC may display a decreased thickening time when compared to an otherwise similar wellbore servicing compositions lacking an HRCB of the type described herein. The RCWC may display an increased thickening time when compared to otherwise similar wellbore servicing compositions lacking a GIR of the type described herein. The thickening time refers to the time required for the composition to achieve 70 Bearden units of Consistency (Bc). At about 70 Bc, the slurry undergoes a conversion from a pumpable fluid state to a non-pumpable paste. A thickening time that allows the composition to remain pumpable without gelling during downhole placement may be determined by one of ordinary skill in the art to meet the needs of the process with the aid of this disclosure.

In an embodiment, the RCWC may have a thickening time of greater than about 1 hour, alternatively greater than about 5 hours, alternatively greater than about 10 hours, alternatively greater than about 15 hours, alternatively greater than about 20 hours at temperatures of from about 50° F. to about 400° F., alternatively from about 120° F. to about 300° F., alternatively greater than about 200° F.

In an embodiment the RCWC may react with water, set, and become a hard mass with compressive strengths of from about 250 psi to about 20000 psi, alternatively from about 500 to about 5000 psi, alternatively from about 1000 to about 3000 psi. Herein the compressive strength is defined as the capacity of a material to withstand axially directed pushing forces. The maximum resistance of a material to an axial force is determined in accordance with American Petroleum Institute (API) Recommended Practice 10B, $22^{rd}$ Edition, December 1995. Beyond the limit of the compressive strength, the material becomes irreversibly deformed and no longer provides structural support and/or zonal isolation.

In an embodiment the RCWC has a hydration time of from about 0.5 to about 48 hrs, alternatively from about 1 to about 24 hrs, alternatively from about 2 to about 12 hrs, after the cement slurry consistency reaches 70 Bearden units under wellbore conditions and the thickening time measured under dynamic conditions using a Cement Consistometer, as determined in accordance with ANSI/API Recommended Practice 10B-2 (Formerly 10B), $1^{st}$ Edition, July 2005. The hydration time refers to time at which the recorded slurry temperature trace intercepts the heating oil temperature trace indicating poor heat transmission between the heating oil and the cement slurry that has become non-flowable paste.

The RCWCs can be used for any purpose. In an embodiment, the RCWCs are used to service a wellbore that penetrates a subterranean formation. It is to be understood that "subterranean formation" encompasses both areas below exposed earth and areas below earth covered by water such as ocean or fresh water. Servicing a wellbore includes, without limitation, positioning the RCWC in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; as a chemical packer to be used as a fluid in front of cement slurry in cementing operations; and to seal an annulus between the wellbore and an expandable pipe or pipe string. For instance, the RCWC may viscosify in a loss-circulation zone and thereby restore circulation. The viscosified mixture can set into a flexible, resilient and tough material, which may prevent further fluid losses when circulation is resumed. The RCWC may withstand substantial amounts of pressure, e.g., the hydrostatic pressure of a drilling fluid or cement slurry, without being dislodged or extruded. The RCWC may provide a relatively viscous mass inside the loss-circulation zone. The RCWC can also form a non-flowing, intact mass inside the loss-circulation zone. This mass plugs the zone and inhibits loss of subsequently pumped drilling fluid, which allows for further drilling. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the RCWC may be employed in well completion operations such as primary and secondary cementing operations. Said compositions may be placed into an annulus of the wellbore and allowed to set such that it isolates the subterranean formation from a different portion of the wellbore. The RCWC thus form a barrier that prevents fluids in that subterranean formation from migrating into other subterranean formations. Within the annulus, the fluid also serves to support a conduit, e.g., casing, in the wellbore.

In an embodiment, the wellbore in which the RCWC are positioned belongs to a multilateral wellbore configuration. It is to be understood that a multilateral wellbore configuration includes at least two principal wellbores connected by one or more ancillary wellbores. In secondary cementing, often referred to as squeeze cementing, RCWC may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a wellbore servicing composition in a wellbore are described in U.S. Pat. Nos. 5,346,012 and 5,588,488, which are incorporated by reference herein in their entirety.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The effect of the addition of various amounts of Class C Fly ash on the thickening time of wellbore servicing compositions was investigated. Eleven compositions, designated Samples 1-11, comprising various cementitious materials, were prepared according to API Recommended Practice 10B-2 (Formerly 10B), First Edition, July 2005. These cement slurries contained API Class A Cement, API Class C Fly ash, HR®-5, citric acid, ALCOSPERSE 240, CFR-3, FDP 750, and water in the percentage amounts indicated in Table 1. API Class A Cement and API Class C Fly ash are widely commercially available cementitious materials. Citric acid is a widely commercially available set modifier and HR®-5 is a lignosulfonate salt which is a set modifier commercially available from Halliburton Energy Services. ALCOSPERSE 240 is a sulfonated copolymer commercially available from ALCO Chemical Company. FDP 750 is a sulfonated styrene polymer commercially available from Halliburton Energy Services. CFR-3 cement friction reducer is a dispersant commercially available from Halliburton Energy Services. The cement slurries were cured at 200° F. and the thickening times of the slurries were measured according to the previously referenced API procedure at 200° F. at 8000 psi. The results are tabulated in Table 1.

However, the addition of a GIR (e.g., ALCOSPERSE 240) in Sample 10 increased the thickening time of the sample. The results demonstrate that GIRs comprising copolymers comprising both sulfonated aromatic monomers and acrylate monomers (e.g., ALCOSPERSE 240) lengthened the thickening time and prevented premature gelation of compositions comprising an HRCB.

The results also indicate that when an HRCB (i.e., Class C fly ash) is present in an amount of higher than 30% bwoc (Samples 1-7), set modifiers (e.g., citric acid) and gel inhibitors (e.g., FDP 750) can be used in combination with the GIRs of this disclosure to adjust the thickening time of the slurry.

TABLE 1

| Sample | Class A Cement % bwoc | Class C Fly ash % bwoc | HR-5 % bwoc | Citric Acid % bwoc | ALCOSPERSE 240 g/sk | CFR-3 g/sk | FDP 750 g/sk | Density ppg | Thickening Time hrs:min 70Bc | Hydration Time hrs:min |
|---|---|---|---|---|---|---|---|---|---|---|
| 1 | 30 | 100 | | | 0.3 | | | 16 | 0:34 | >1:45 |
| 2 | 30 | 100 | | | 0.1 | | | 16 | 0:27 | 0:45 |
| 3 | 100 | 100 | | | 0.1 | | | 16 | 1:00 | 5:15 |
| 4 | 100 | 100 | | | 0.05 | 0.05 | 0.1 | 16 | 1:36 | >2:30 |
| 5 | 100 | 100 | | | 0.05 | 0.1 | 0.15 | 15 | 15:56 | n.d |
| 6 | 100 | 100 | | 0.5 | 0.1 | 0.2 | 0.1 | 15 | 2:15 | 2:15 |
| 7 | 100 | 100 | | 0.5 | 0.1 | | 0.1 | 15 | 13:10 | 13:10 |
| 8 | 100 | 30 | 0.5 | | | | | | 4:13 | 8:13 |
| 9 | 100 | 30 | 0.5 | | | | | 16 | 4:03 | 5:25 |
| 10 | 100 | 30 | 0.5 | | 0.1 | | | 16 | 11:30 | n.d |
| 11 | 100 | 30 | 0.5 | | | | 0.152 | 16 | 4:37 | 7:20 |

Referring to Table 1, in Samples 1 to 11 increasing the amount of HRCB (i.e., Class C fly ash) resulted in a decreased thickening time. A comparison of samples 8 to 11 indicate the addition of a sulfonated styrene copolymer (e.g., FDP 750) in Sample 11, which is known to be an effective gel inhibitor, failed to break the gel and extend the thickening time of the cement compositions comprising Class C Fly ash. This was evidenced by the similar thickening and hydration times of Samples 8, 9, and 11. Similar results were obtained when FDP 750 was replaced with FDP 742, a copolymer of sulfonated styrene and maleic anhydride commercially available from Halliburton Energy Services, which is also known to be an effective retarder for Portland cements.

Example 2

The effect of varying the amount of HRCB on the thickening time of slurries was investigated. Ten cement slurries, designated Samples 12-21, comprising Class A cement and the HRCB cement kiln dust were prepared as described in Example 1. The cement slurry components and amounts of each component are as indicated in Table 2. The cement slurries were cured and the thickening times of the slurries were measured as described in Example 1. The results of these measurements are tabulated in Table 2.

TABLE 2

| Sample | Class A Cement % bwoc | Cement Kiln Dust % bwoc | Class F Flyash % bwoc | HR-5 % bwoc | ALCOSPERSE 240 g/sk[1] | CFR-3 g/sk | FDP 750 g/sk | Density ppg | Thickening Time hrs:min 70Bc | Hydration Time hrs:min |
|---|---|---|---|---|---|---|---|---|---|---|
| 12 | 30 | 100 | | | 0.1 | | 0.1 | 15 | 0:01 | 5:40 |
| 13 | 30 | 100 | | 0.5 | 0.1 | | | 15 | 0:14 | 9:30 |
| 14 | 30 | 100 | | | 0.34 | | | 15 | >75 hrs | n.d |
| 15 | 100 | 100 | | | 0.05 | 0.05 | 0.1 | 15 | 0:50 | 2:45 |
| 16 | 100 | 30 | | 0.5 | | | | 16 | 2:21 | 3:50 |
| 17 | 100 | 30 | | 0.5 | 0.1 | | | 16 | 20:50 | 23:00 |
| 18 | 100 | 30 | | 0.5 | | | 0.152 | 16 | 2:17 | 4:45 |
| 19 | — | 100 | 100 | | 0.1 | | | 15 | 13:20 | 15:00 |
| 20 | — | 100 | 100 | | 0.1 | | | 15 | 4:35 | 13:30 |
| 21 | — | 100 | 100 | | 0.05 | | | 15 | >24 hrs | n.d |

[1]g/sk = gallon/sack of cement
n.d—not determined

Referring to Samples 16 and 18, the addition of a conventional gel inhibitor (i.e., FDP 750) in Sample 18 failed to break the gel and retard the cement compositions comprising cement kiln dust as evidenced by the similar thickening and hydration times of Samples 16 and 18. Similar results were obtained when FDP 750 was replaced with FDP 742 a copolymer of sulfonated styrene and maleic anhydride which is also known to be gel inhibitor for Portland cements. However, the addition of a GIR (i.e., ALCOSPERSE 240) in Sample 17 increased the thickening time, such that the hydration times of the sample was closer to the thickening time indicating good gel inhibition when compared to Samples 16 and 18. Further the comparable thickening and hydration times indicated the potential for rapid strength development after the cement loses its fluidity.

When cement kiln dust is present in an amount of higher than 30% bwoc (Samples 12-15), additional set modifiers (e.g., HR®-5) and gel inhibitors (e.g., FDP-750) can be used in combination with the GIRs of this disclosure to adjust the thickening time of HRCB samples.

Additionally, the GIRs of this disclosure can be used to adjust the thickening time of a cement composition containing cement kiln dust and Class F fly ash and lacking a Portland cement as shown in Samples 19-21.

Example 3

The heat of hydration for various cement compositions in the presence of a conventional retarder and a GIR was investigated. Four samples, designated Samples 22-25, were prepared. Sample 22 was a control sample prepared using 100% of Class C Flyash, and 44.35% bwoc water. Sample 23 was a cement composition prepared using 100% of Class C Flyash, 44.35% bwoc water, and 0.1 gal/sack of FDP 750 which is 25 wt. % solution in water (labeled as poly(SS) in FIG. 1). Sample 24 was a cement composition prepared from 100% of Class C Flyash, 44.44% bwoc of water, and 0.5% bwoc of FDP 742 (labeled as poly (SSMA) in FIG. 1), which is a commercial high performance high temperature retarder for Portland cement. Sample 25 was prepared from 100% of Class C Flyash, 44.45% bwoc of water, and 0.1 gal/sack GIR which is ALCOSPERSE 240 as a 44 wt. % solution in water. The final slurry densities were 14.22 pounds per gallon (ppg).

Figure 1:
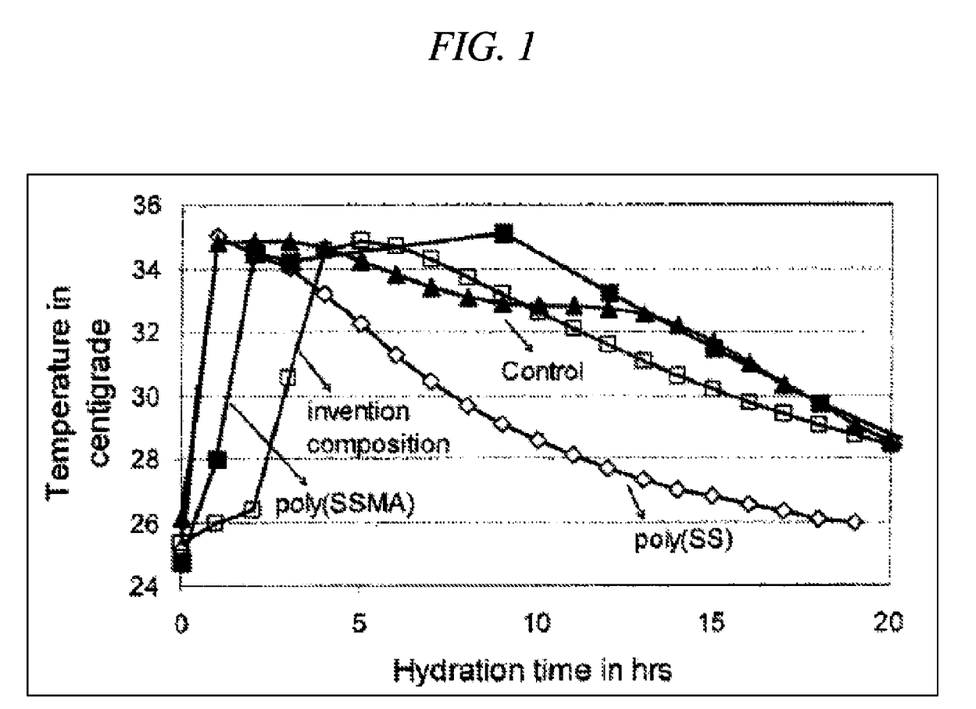
FIG. 1 is a plot of hydration temperature as a function of time under adiabatic conditions for the samples from Example 1.

The components of each sample were mixed and placed in a thermoflask and the temperature rise due to cement hydration was measured over time. FIG. 1 is a plot of temperature as a function of hydration time. Referring to FIG. 1, Samples 22-24, comprising conventional retarders exhibited a hydration time, as determined by the time to reach a temperature of 35° C., of about 2 hours. In comparison, the hydration time for Sample 25 comprising a GIR of the type disclosed herein was about four hours. The results demonstrate the ability of GIRs of the type described herein to lengthen the hydration time of cement compositions comprising HRCBs. Without wishing to be limited by theory, the GIRs of the present disclosure may function to prevent or delay gel formation and/or break down the gel once formed, as well as delay the hydration of non-gelling hydraulic components such as tricalcium and dicalcium silicates.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore comprising:
   placing in the wellbore a composition comprising a non-API compliant reactive calcium silicate based hydraulic binder, wherein the non-API compliant reactive calcium silicate based hydraulic binder, when mixed with water alone, has a thickening time of less than 90 minutes, at least one gelation inhibiting retarder, and a set modifier; and
   allowing the composition to set.

2. The method of claim 1 wherein the reactive calcium silicate based hydraulic binder comprises tricalcium aluminate, tetracalcium aluminoferrite, or combinations thereof.

3. The method of claim 2 wherein the total amount of tricalcium aluminate and tetracalcium aluminoferrite is greater than about 15 wt. % of the highly reactive binder.

4. The method of claim 2 wherein the ratio of tricalcium aluminate:tetracalcium aluminoferrite is from about 5:1 to about 0.5:1.

5. The method of claim 1 wherein the reactive calcium silicate based hydraulic binder comprises non-API Class C flyash, cement kiln dust, blast furnace slag, or combinations thereof.

6. The method of claim 5 wherein the class C fly ash has a lime content of greater than about 15 wt. %.

7. The method of claim 5 wherein the cement kiln dust has an analytical lime content of from about 15 wt. % to about 60 wt. %.

8. The method of claim 5 wherein the blast furnace slag has a silica content of from about 25 wt. % to about 45 wt. %, an alumina content of from about 7 wt. % to about 20 wt. %, a magnesia content of from about 1 wt. % to about 20 wt. %, and an analytical lime content of from about 30 wt. % to about 50 wt. %.

9. The method of claim 1 wherein the reactive calcium silicate based hydraulic binder is present in the wellbore servicing composition in an amount of from about 30 wt. % to about 100 wt. % based on the total solid weight of the composition.

10. The method of claim 1 wherein the gelation inhibiting retarder is present in the wellbore servicing composition in an amount of from about 0.05 wt. % to about 4.0 wt. % based on the total solid weight of the composition.

11. The method of claim 1 wherein the gelation inhibiting retarder comprises a copolymer having a molecular weight of from about 1,000 Daltons to about 50,000 Daltons.

12. The method of claim 11 wherein the copolymer comprises least one sulfonated monomer, at least one carboxylated monomer, and at least one nonionic monomer.

13. The method of claim 11 wherein the copolymer comprises at least two sulfonated monomers, at least one carboxylated monomer, and at least one nonionic monomer.

14. The method of claim 11 wherein the copolymer comprises at least one allyloxybenzenesulfonic acid monomer having the general chemical structure (I), wherein $R_4$ is hydrogen or a $C_1$-$C_6$ alkyl; and X is hydrogen, an alkali or alkaline earth metal or ammonium; at least one methallyl sulfonic acid monomer; at least one copolymerizable nonionic monomer; and at least one copolymerizable olefinically unsaturated carboxylic acid monomer.

15. The method of claim 14 wherein the methallyl sulfonic acid monomer comprises methallyl sulfonic acid, alkali metal salts of methallyl sulfonic acid, alkaline earth metal salts of methallyl sulfonic acid, ammonium salts of methallyl sulfonic acid, or combinations thereof.

16. The method of claim 14 wherein the copolymerizable nonionic monomer comprises monomers represented by the general chemical structure:

wherein $n_1$ and $n_2$ are independently 0 to 10; $R_1$, $R_2$, $R_8$ and $R_9$ are independently hydrogen, $C_1$-$C_6$ alkyl, or $C_1$-$C_6$ alkyl-substituted aryl; $R_7$ is hydrogen, $C_1$-$C_6$ alkyl, or $CO_2X$, where X is hydrogen, an alkali or alkaline earth metal or $C_1$-$C_6$ alkyl; $X_1$ and $X_2$ are absent or are independently O, C=O, or hydrogen; $R_3$ is absent or is C(=O)$R_4$, $OR_4$, $NR_5R_6$, $C_1$-$C_{18}$ alkyl or hydrogen where $R_4$ is $C_1$-$C_{18}$ alkyl or hydrogen and $R_5$ and $R_6$ are independently hydrogen, $C_1$-$C_6$ alkyl, or an alkyloxyether or alcohol; and $R_{10}$ is absent or is C(=O)$R_{11}$, $OR_{11}$, $NR_{12}R_{13}$, $C_1$-$C_{18}$ alkyl, or hydrogen, where $R_{11}$ is $C_1$-$C_{18}$ alkyl or hydrogen, $R_{12}$ and $R_{13}$ are independently hydrogen, $C_1$-$C_6$ alkyl, or an alkyloxyether or alcohol.

17. The method of claim 14 wherein the copolymerizable nonionic monomer comprises $C_1$-$C_6$ alkyl esters of (meth) acrylic acid, the alkali or alkaline earth metal or ammonium salts thereof, acrylamide, $C_1$-$C_6$ alkyl-substituted acrylamides, N-alkyl-substituted acrylamides, N-alkanol-substituted acyrylamides, $C_1$-$C_6$ alkyl esters of unsaturated vinylic acids, $C_1$-$C_6$ alkyl half-esters of unsaturated vinylic acids, $C_1$-$C_6$ alkyl esters of saturated aliphatic monocarboxylic acids, or combinations thereof.

18. The method of claim 14 wherein the copolymerizable olefinically unsaturated carboxylic acid monomer comprises aliphatic, branched or cyclic, mono- or dicarboxylic acids, alkali metal salts thereof; alkaline earth metal salts thereof; ammonium salts thereof; anhydrides thereof; or combinations thereof.

19. The method of claim 1 wherein the wellbore servicing composition further comprises non-API compliant Portland cement, API compliant Portland cement, or combinations thereof.

20. The method of claim 19 wherein the non-API compliant Portland cement is present in an amount of from about 20 wt. % to about 100 wt. % of the total weight of solids in the composition.

21. The method of claim 19 wherein the API compliant Portland cement is present in an amount of from about 0 wt. % to about 99 wt. % of the total weight of solids in the composition.

22. The method of claim 1 wherein the wellbore servicing composition further comprises a filler.

23. The method of claim 22 wherein the filler comprises class F fly ash, sand, silica, or combinations thereof.

24. The method of claim 22 wherein the filler comprises class F fly ash which is present in an amount of from about 5 wt. % to about 60 wt. % of the total solid weight of the composition.

25. The method of claim 1 wherein the wellbore servicing composition has a thickening time of greater than about 1 hour.

26. The method of claim 1 wherein the wellbore servicing composition has a hydration time of from 0.5 hours to 48 hours.

27. The method of claim 1 wherein the set modifier comprises organic acids, citric acid, tartaric acid, lignosulfonates, or combinations thereof.

28. A method of servicing a wellbore comprising:
placing in a wellbore a cement composition comprising a cementitious material consisting essentially of an industrial waste product selected from the group consisting of Class C Hy ash, cement kiln dust, and combinations thereof, wherein the cementitious material, when mixed with water alone, has a thickening time of less than 90 minutes and a gelation inhibitor; and
allowing the composition to set.

29. A method of servicing a wellbore comprising:
controlling the thickening time of a cementitious composition by contacting a material having from about 20% to about 40% of tricalcium aluminate and tetracalcium aluminoferrite with a gelation inhibitor comprising an alkylbenzene sulfonic acid, at least one methallyl sulfonic acid monomer, at least one copolymerizable nonionic monomer, and at least one copolymerizable olefinically unsaturated carboxylic acid monomer;
placing the composition in the wellbore; and
allowing the composition to set.

30. The method of claim 29 wherein the material is a non-API compliant Portland cement.

* * * * *